Nov. 3, 1936.                    C. B. SPASE                    2,059,407
                            CLUTCH TESTING DEVICE
                             Filed July 14, 1934

INVENTOR.
Charles B. Spase
BY
Ray, Oberlin & Ray
ATTORNEYS

Patented Nov. 3, 1936

2,059,407

UNITED STATES PATENT OFFICE 2,059,407

CLUTCH TESTING DEVICE

Charles B. Spase, Syracuse, N. Y., assignor to Ira Saks, Cleveland, Ohio

Application July 14, 1934, Serial No. 735,248

10 Claims. (Cl. 33—180)

The present invention relates to a device for testing and checking clutch parts of the type of clutch which is most usually employed in automotive vehicles. Such clutches are commonly referred to as being of the "disc type".

It is the general object and nature of my invention to provide a testing device for the disc type of clutch, and which is intended for and best adapted for use in the repair and servicing of automotive clutches in garages and repair shops.

One object of the invention is to provide a device which will enable the repair man to determine the proper alignment of clutch parts, such as the clutch plate, the friction facing rings, the spacing springs and the operating levers, in a rapid and convenient manner.

More particular objects and advantages of the invention will become apparent during the following description.

To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

Figure 1:
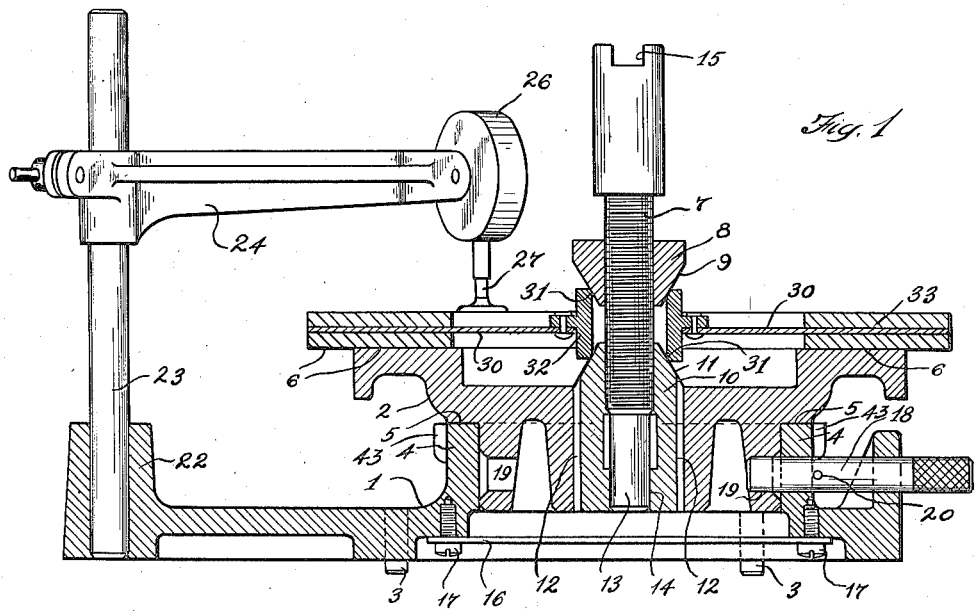
Figure 2:
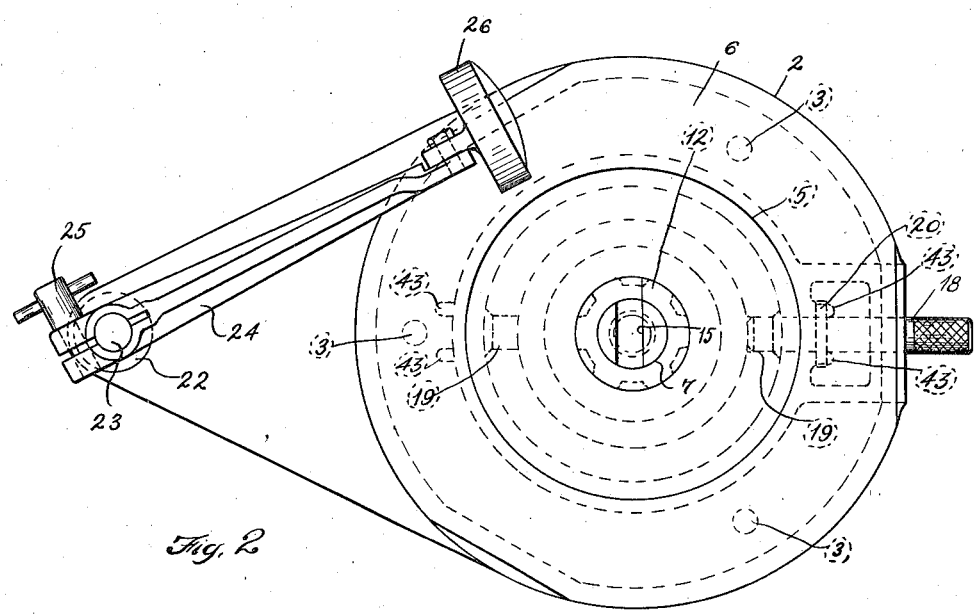

In said annexed drawing:

Fig. 1 is a sectional elevational view of the device embodying the principle of my invention; Fig. 2 is a plan view thereof.

Referring more particularly to the drawing, the device includes a base member 1 which rotatably supports a circular member 2. Three studs or pins 3 may be provided in the bottom of the base 1 for the purpose of maintaining the device in a plane parallel to the horizontal surface, such as a work bench, upon which it might be located. The base 1 includes an upwardly extending, annular portion 4, which is adapted to support the rotatable member 2. The annular upright portion 4 and the rotatable member 2 contact in a bearing surface 5.

The upper surface of the rotatable member 2 is in the form of a plane annular surface 6, which lies in a horizontal plane.

A threaded shaft 7 is engaged by a member 8 having a conical surface 9. The outer surface of the member 8, adjacent the conical surface 9 may be in the form of a hexagon in order that a wrench may be engaged therewith. A second member 10 also threadably engages with the shaft 7 and also has a conical surface 11 which extends in a direction opposite to that of the conical surface 9. The member 10 is non-rotatably and slidably engaged with the rotatable member 2 by means of a key-way or spline 12.

The lower end portion of the shaft 7 is not threaded, but is smooth as shown at 13 and adapted to make a journalled or bearing fit with the inner wall portion 14 of the member 10. The purpose of this last-described structure is to provide an alignment bearing which will serve to maintain the shaft 7 in a perpendicularly aligned position with respect to the member 10 and the surface 6 of the rotatable member 2.

The upper end of the shaft 7 has a rectangular slot 15 for the reception of a lever or bar. A plate 16 is fastened to the base 1 by means of the screw 17 and is for the purpose of preventing the member 10 from sliding too far down into the spline 12 when not in operative position.

A pin or bar 18 is journalled in the base 1 and its inner end is adapted to be inserted into either one of the apertures 19 of the rotatable member 2 whereby the latter may be locked against rotation. A pin 20 transversely mounted in the bar 18 limits the longitudinal movement of the latter. The left hand portion of the base 1 has a boss 22 which supports the vertical standard 23. The standard 23 in turn carries the horizontal arm 24. The arm 25 may be adjustably positioned upon the standard 23 at various heights by means of the tightening screws 25. The outer end of the vertical arm 24 carries an indicator 26 which has a downwardly depending feeler 27.

Directing attention to Fig. 1, the operation of the device is as follows: A clutch plate 30 is engaged on the shaft 7 by means of tightening the members 8 and 10. The conical surfaces 9 and 11 respectively of the last two members engage with the beveled inner edges 31 of the hub 32 of the clutch plate. In this manner, the hub 32 and clutch plate 30 are held in radial alignment with respect to the shaft 7, much in the same manner as a circular or cylindrical piece is mounted between the centers of a lathe. It should also be noted at this point that the members 8 and 10 are adapted to engage with a variety of sizes of clutch plate hubs. The clutch plate 30 may be attached to the shaft 7 either while it is in the position shown in Fig. 1, or the member 10 may be removed from the device and the clutch plate may be attached at a removed point.

In order to test the clutch plate 30 for radial alignment, or "run-out", the bar 18 is moved outwardly whereby the rotatable member is unlocked, and a lever or bar may be inserted in the slot 15 and the rotatable member and clutch plate 30 rotated past and in contact with the feeler 27. During such rotation, the operator watches the dial of the indicator 26 and thereby determines whether the surface of the clutch plate conforms to the necessary precision limits. It should also be noted that a clutch plate assembly which has more than one clutch plate may equally as well be tested upon the device. Such an operation merely involves raising the arm 24 to a higher position on the standard 23 to accommodate the greater thickness of a plural clutch plate assembly. It should also be clear that the last described measuring and testing means is equally well adaptable to check the alignment of the clutch disc, the friction facing rings, spacing springs which are present in a double plate assembly, and also the alignment of operating levers which may also be present in a clutch plate assembly.

It should also be noted that the essential elements of a clutch assembly are duplicated in the above described testing device. The rotatable member 2 and surface 6 correspond to the pressure plate or flywheel of the clutch assembly, and the bearing 14 corresponds to a pilot bearing. In this manner, a clutch plate may be inserted in the device and tested, and the operator may readily determine the proper accuracy and alignment with which the clutch plate will fit in the actual clutch assembly.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. A clutching testing device comprising the combination of a base member, a member rotatable on said base member, a shaft positioned centrally of said rotatable member, threaded members on said shaft having oppositely disposed conical surfaces and adapted to engage and retain the hub of a clutch plate in co-axial position on said shaft, one of said threaded members being removably, non-rotatably and slidably mounted in said rotatable member, so as to permit said shaft and said threaded members, with said clutch plate attached, to be removed from and installed in locked rotational position on said rotatable member.

2. A clutch testing device comprising the combination of a base member, a member rotatable on said base member, a shaft positioned centrally of said rotatable member, threaded members on said shaft having oppositely disposed conical surfaces and adapted to engage and retain the hub of a clutch plate in co-axial position on said shaft, one of said threaded members being removably, non-rotatably and slidably mounted in said rotatable member, so as to permit said shaft and said threaded members, with said clutch plate attached, to be removed from and installed in locked rotational position on said rotatable member, one end portion of said shaft having a smooth surface and being adapted to make a journalled fit in the last-named of said threaded members.

3. A clutch testing device comprising the combination of a base member, a member rotatable on said base member, a shaft positioned centrally of said rotatable member, threaded members on said shaft having oppositely disposed conical surfaces and adapted to engage and retain the hub of a clutch plate in co-axial position on said shaft, one of said threaded members being removably, non-rotatably and slidably mounted in said rotatable member, so as to permit said shaft and said threaded members, with said clutch plate attached, to be removed from and installed in locked rotational position on said rotatable member, and means carried by said base member for measuring the radial alignment of said clutch plate.

4. In a clutch testing device, the combination of a rotatable member having a horizontally disposed plane upper surface, a base member supporting said rotatable member, a shaft removably and non-rotatably carried by said rotatable member, and means on said shaft for gripping the hub of a clutch plate, whereby a radial face of said clutch plate is adapted to contact said plane surface; said shaft and said gripping means with said clutch plate attached being so constructed as to permit the removal from and installation thereof in locked rotational position on said rotatable member.

5. In a clutch testing device, the combination of a rotatable member having a horizontally disposed plane upper surface, a base member supporting said rotatable member, a shaft removably and non-rotatably carried by said rotatable member, means on said shaft for gripping the hub of a clutch plate, whereby a radial face of said clutch plate is adapted to contact said plane surface; said shaft and said gripping means with said clutch plate attached being so constructed as to permit the removal from and installation thereof in locked rotational position on said rotatable member, and means carried by said base member for measuring the radial alignment of said clutch plate.

6. In a clutch testing device, the combination of a rotatable member having a horizontally disposed plane upper surface, a base member supporting said rotatable member, a shaft removably and non-rotatably carried by said rotatable member, means on said shaft for gripping the hub of a clutch plate, whereby a radial face of said clutch plate is adapted to contact said plane surface; said shaft and said gripping means with said clutch plate attached being so constructed as to permit the removal from and installation thereof in locked rotational position on said rotatable member, and means for locking said rotatable member against rotation.

7. In a clutch testing device, the combination of a rotatable member having a horizontally disposed plane upper surface, a base member supporting said rotatable member, a shaft removably and non-rotatably carried by said rotatable member, threaded members engaging said shaft having oppositely disposed conical surfaces adapted to engage and retain the hub of a clutch plate, whereby a radial face of said clutch plate is adapted to contact said plane surface; one of said threaded members being removably, non-rotatably and slidably mounted in said rotatable member, so as to permit said shaft and said threaded members, with said clutch plate attached, to be removed from and installed in locked rotational position on said rotatable member.

8. In a clutch testing device, the combination of a rotatable member having a horizontally disposed plane upper surface, a base member supporting said rotatable member, a shaft removably and non-rotatably carried by said rotatable member, threaded members engaging said shaft having oppositely disposed conical surfaces adapted to engage and retain the hub of a clutch plate, whereby a radial face of said clutch plate is adapted to contact said plane surface; one of said threaded members being removably, non-rotatably and slidably mounted in said rotatable member, so as to permit said shaft and said threaded members, with said clutch plate attached, to be removed from and installed in locked rotational position on said rotatable member, and means carried by said base member for measuring the radial alignment of said clutch plate.

9. In a clutch testing device, the combination of a rotatable member having a horizontally disposed plane upper surface, a base member supporting said rotatable member, a shaft removably and non-rotatably carried by said rotatable member, threaded members engaging said shaft having oppositely disposed conical surfaces adapted to engage and retain the hub of a clutch plate, whereby a radial face of said clutch plate is adapted to contact said plane surface; one of said threaded members being removably, non-rotatably and slidably mounted in said rotatable member, so as to permit said shaft and said threaded members, with said clutch plate attached, to be removed from and installed in locked rotational position on said rotatable member, one end portion of said shaft having a smooth surface and being adapted to make a journalled fit in the last-named of said threaded members.

10. In a clutch testing device, the combination of a rotatable member having a horizontally disposed plane upper surface, a base member supporting said rotatable member, a shaft removably and non-rotatably carried by said rotatable member, threaded members engaging said shaft having oppositely disposed conical surfaces adapted to engage and retain the hub of a clutch plate, whereby a radial face of said clutch plate is adapted to contact said plane surface; one end portion of said shaft having a smooth surface and being adapted to make a journalled fit in the last-named of said threaded members, and means carried by said base member for measuring the radial alignment of said clutch plate.

CHARLES B. SPASE.